United States Patent [19]

Minagawa et al.

[11] 4,222,931
[45] Sep. 16, 1980

[54] STABILIZERS FOR SYNTHETIC POLYMERS COMPRISING 2,2,6,6-TETRAMETHYL-4-PIPERIDYL ETHER ALCOHOL OR ETHER, PHOSPHONIC ACID ESTER AND PHENOLIC ANTIOXIDANT

[75] Inventors: Motonobu Minagawa, Kosigaya; Yutaka Nakahara, Iwatsuki; Naohiro Kubota; Toshihiro Shibata, both of Urawa, all of Japan

[73] Assignee: Argus Chemical Corporation, Brooklyn, N.Y.

[21] Appl. No.: 858,773

[22] Filed: Dec. 8, 1977

[30] Foreign Application Priority Data

Dec. 24, 1976 [JP] Japan ................... 51-155972

[51] Int. Cl.[2] .................. C08K 5/35; C08K 5/53; C09K 15/20; C09K 15/32
[52] U.S. Cl. ................. 260/45.8 NZ; 252/400 A; 252/403; 252/405; 252/407; 260/45.7 P; 260/45.8 R; 260/45.85 B; 260/45.95 H; 260/45.95 R; 528/73; 528/291; 546/18
[58] Field of Search ............. 260/45.7 P, 45.8 R, 260/45.8 NP, 293.66 (U.S. only), 45.8 NZ (U.S. only), 45.7 PT

[56] References Cited

U.S. PATENT DOCUMENTS

| | | | |
|---|---|---|---|
| 3,496,134 | 2/1970 | Di Giaimo | 260/45.9 NC |
| 3,539,531 | 11/1970 | Drake et al. | 260/45.7 P |
| 3,749,694 | 7/1973 | Cantatore et al. | 260/45.7 P |
| 3,790,648 | 2/1974 | Schmidt et al. | 260/970 |
| 3,839,273 | 10/1974 | Murayama et al. | 260/293.66 |
| 3,840,494 | 10/1974 | Murayama et al. | 260/45.8 NP |
| 3,959,291 | 5/1976 | Cook | 260/45.8 NP |
| 4,016,168 | 4/1977 | Murayama et al. | 260/293.66 |
| 4,024,103 | 5/1977 | Heinrich et al. | 260/45.7 P |
| 4,067,931 | 1/1978 | Batorewicz | 260/45.8 R |

*Primary Examiner*—Hosea E. Taylor
*Assistant Examiner*—R. A. White

[57] ABSTRACT

Stabilizers for organic polymeric materials are provided, comprising a phosphonic acid ester, a phenolic antioxidant and a 2,2,6,6-tetramethyl-4-piperidyl ether alcohol or ether having the general formula:

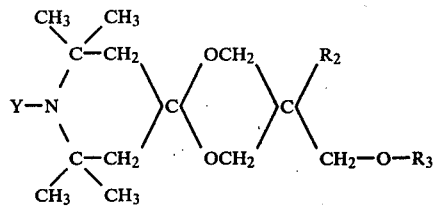

wherein
R$_2$ is lower alkyl or hydroxyalkyl having from one to six carbon atoms;
R$_3$ is a hydrogen atom, provided R$_2$ is hydroxyalkyl;

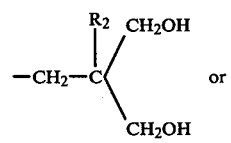

or

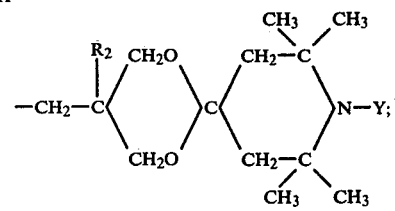

R$_2$ and R$_3$ may be taken together to form

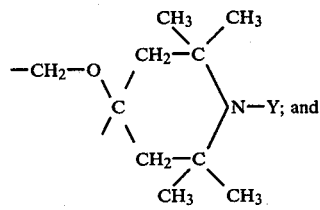

Y is selected from the group consisting of hydrogen and O.

27 Claims, No Drawings

STABILIZERS FOR SYNTHETIC POLYMERS COMPRISING 2,2,6,6-TETRAMETHYL-4-PIPERIDYL ETHER ALCOHOL OR ETHER, PHOSPHONIC ACID ESTER AND PHENOLIC ANTIOXIDANT

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

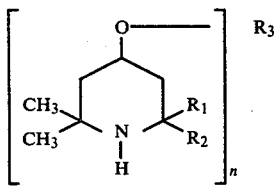

or a salt thereof.

In the above formula:

$R_1$ and $R_2$ which may be the same or different, each are an alkyl group such as methyl, ethyl, isopropyl or dodecyl, or they form, together with the carbon atom to which they are attached, a saturated alicyclic group such as:

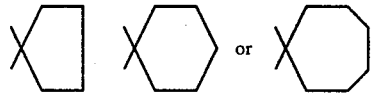

or a group of the formula

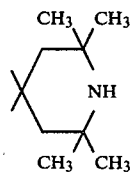

n is an integer of 1 to 3 inclusive; and $R_3$ is an acyl group. These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

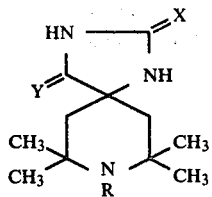

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al in U.S. Pat. No. 3,899,464 patented Aug. 12, 1975 disclose a variation of the piperidino spiro compounds having the formula:

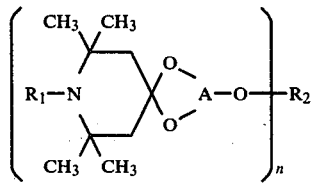

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, n is an integer of 1 to 4;

when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

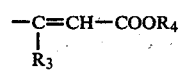

in which $R_3$ represents hydrogen atom, a lower alkyl group or phenyl group and $R_4$ represents an alkyl group;

when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when n is 3, $R_2$ represents an aromatic triacyl group or a trivalent group from an oxoacid; and when n is 4, $R_2$ represents an aromatic tetraacyl group, and A represents a group

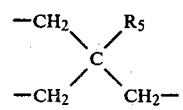

in which

R$_5$ represents hydrogen atom or a lower alkyl group or, when n is 1, R$_5$ may represent together with R$_2$ a group

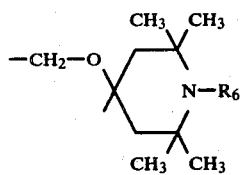

in which

R$_6$ represents the same group as defined in R$_1$ and may be the same or different from R$_1$, or a group

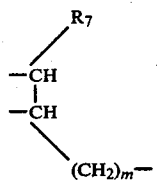

in which m is 1 or 2 and R$_7$ represents hydrogen atom or, when n and m are 1, R$_7$ represents methylene group together with R$_2$.

Murayama et al U.S. Pat. No. 3,840,494, patented Oct. 8, 1974 provides acid esters of 4-piperidinol derivatives having the formula:

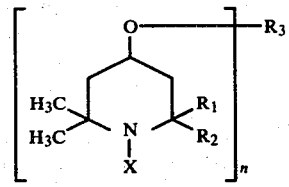

wherein

R$_1$ and R$_2$ may be the same or different and represent an alkyl group of one to four carbon atoms or they may form, together with the carbon atom to which they are attached, a saturated alicyclic group or the group of the formula:

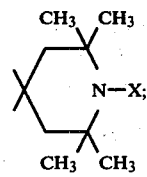

X is hydrogen atom, oxygen free radical (—O) or an alkyl group of one to four carbon atoms;

n is an integer of 1 through 4 inclusive; and

R$_3$ represents, when n is 1, an acyl group derived from an aliphatic or aromatic monocarboxylic acid, when n is 2, a diacyl group derived from an aliphatic or aromatic dicarboxylic acid or carbonyl group, when n is 3, a triacyl group derived from an aliphatic or aromatic tricarboxylic acid or a trivalent group obtained by eliminating three hydroxyl groups from phosphoric acid, phosphorous acid or boric acid, and when n is 4, a tetraacyl group derived from an aromatic tetracarboxylic acid or a tetravalent group obtained by eliminating four hydroxyl groups from orthosilicic acid.

Murayama et al U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al U.S. Pat. No. 3,941,744 patented Mar. 2, 1976, disclose another variation of the piperidino spiro derivatives having the formula:

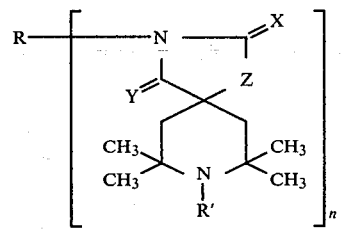

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R" in which R" is hydrogen atom, an alkyl group or a substituted alkyl group;

Z represents oxygen atom or a group of the formula >N—R''' is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group; when n is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl)group, a dialkylene ether group or a diphenylene ether group, when n is 3, an alkanetriyl group, a tris-(acyloxyalkylene) group, an alkane-tris-(oxycarbonylalkyl) group or a group of the group

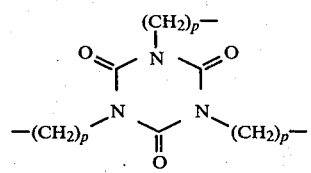

in which p is an integer of 1 through 8 inclusive, and when n is 4, an alkane tetrayl group, a tetrakis-(acyloxyalkylene) group or an alkanetetrakis-(oxycarbonylalkyl) group.

Murayama et al U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

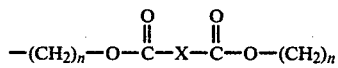

in which n is an integer of 1 or 2 and X is an alkylene group, or o-, m- or p-phenylene group or the carbon atoms of CO groups may be directly joined in the absence of X or a group of the formula:

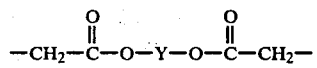

in which

Y is an alkylene group or o-, m- or p-phenylene group.

Ramey et al U.S. Pat. Nos. 3,875,169 patented Apr. 1, 1975 and 3,991,012 patented Nov. 9, 1976 provide bicyclic hindered amines of the formula:

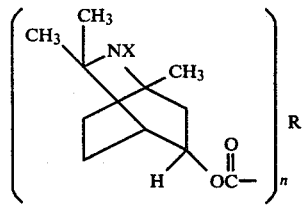

wherein

X is H, O, or OH, n is 1 or 2, and (a) when n is 1, R is straight- or branched-chain alkyl having one to twenty carbon atoms, phenyl or phenyl substituted by one or more lower alkyl groups, and (b) when n is 2, R is straight- or branched-chain alkylene having one to twenty carbon atoms, phenylene or phenylene substituted by one or more lower alkyl groups.

Preferred compounds of formula I are those wherein X is H or O; and n is 1 or 2, and (a) when n is 1, R is n-alkyl having one to twenty atoms, and (b) when n is 2, R is n-alkylene having one to twelve carbon atoms.

Ramey et al U.S. Pat. Nos. 3,907,803 patented Sept. 23, 1975 and 4,001,181 patented Jan. 4, 1977 provide hindered piperidine carboxamide acids and metal salts thereof of the formula:

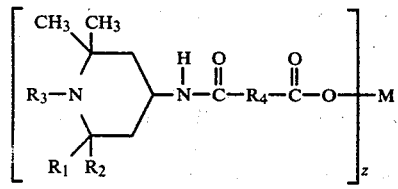

wherein $R_1$ and $R_2$ independently of each other are straight- or branched-chain lower alkyl having one to six carbon atoms, or together with the carbon to which they are bound form a cyclopentyl or cyclohexyl ring, which is unsubstituted or substituted with a methyl group, $R_3$ is hydrogen, alkyl having one to twelve carbon atoms, $\beta$-methoxyethyl alkenyl having three to four carbon atoms, propargyl, benzyl, or alkyl-substituted benzyl, $R_4$ is straight- or branched-chain alkylene having one to eight carbon atoms, phenylene, phenylene substituted with one or more alkyl groups, or the group $-(CH_2)_mY(CH_2)_n-$, wherein Y is oxygen or sulfur and m and n independently of each other are an integer of from 1 to 3, M is hydrogen or a metal selected from the group consisting of barium, nickel, manganese, calcium, zinc, iron, sodium, cobalt, tin, dialkyl tin, and z has a value of from 1 to 4, the value of z being the same as the available valence of M.

Ramey et al U.S. Pat. Nos. 3,899,491, patented Aug. 12, 1975 and 3,920,659, patented Nov. 18, 1975, disclose alkyl alkanoate derivatives of substituted piperazines and substituted piperazinodiones. The substituted piperazines of U.S. Pat. No. 3,899,491 have the formula:

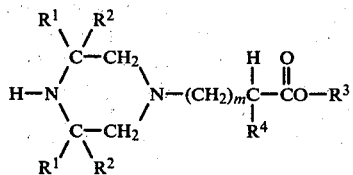

wherein $R^1$ and $R^2$ are methyl or together with the carbon to which they are bound form a mono-cyclic ring system having five or six carbon atoms;

$R^3$ is an alkyl group of from one to twenty atoms;

$R^4$ is hydrogen or methyl, and m is 0 or 1.

The substituted piperazinodiones of U.S. Pat. No. 3,920,659 have the formula:

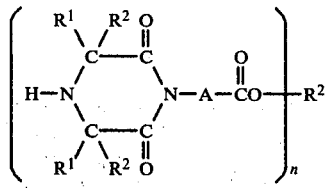

wherein $R^1$ and $R^2$ are independently of each other methyl or ethyl or together with the carbon to which they are bound form a cyclopentyl or cyclohexyl ring, which is unsubstituted or substituted with a methyl group;

n is an integer of from 1 to 2;

when n is 1, $R^3$ is an alkyl group of from one to twenty carbon atoms;

when n is 2, $R^3$ is an alkylene group of from two to eight carbon atoms; and

A is a straight or branched chain (lower)alkylene group containing from one to six carbon atoms with the limitation that the terminals of said alkylene group bear only hydrogen or one (lower) alkyl group.

Ramey et al U.S. Pat. No. 3,920,661 patented Nov. 18, 1975 disclose dicarboxylic acids and salts in which one carboxylic acid group is esterified with a 2,2,6,6-tetrasubstituted-4-hydroxy-piperidine and having the formula:

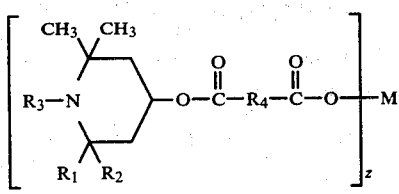

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to twelve carbon atoms, β-methoxyethyl, alkenyl having three or four carbon atoms, propargyl, benzyl or alkyl-substituted benzyl;

$R_4$ is straight or branched-chain alkylene having five to eight carbon atoms, or the group $(CH_2)_m Y(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al U.S. Pat. No. 3,939,163 patented Feb. 17, 1976 disclose closely similar compounds in which $R_4$ is alkylene having from one to four carbon atoms.

Randell et al U.S. Pat. No. 3,939,170 patented Feb. 17, 1976 disclose dehydropyridinyl sulphides, sulphoxides and sulphones having the formula:

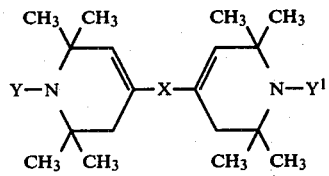

wherein

X is S, SO or $SO_2$ and Y and $Y^1$ are the same or different and each is H, OH, O- or a straight- or branched alkyl residue having from one to four carbon atoms, and salts thereof when Y and $Y^1$ are other than O—.

Randell et al in published patent application No. B408,123 published Apr. 13, 1976 disclose substituted piperidine-4-ols having the formula:

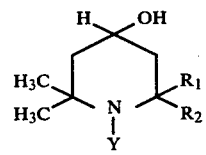

wherein $R_1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

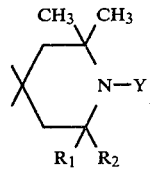

wherein $R_1$ and $R_2$ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group —$CH_2X$ wherein X is the group

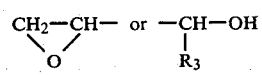

wherein $R_3$ is hydrogen, a methyl or phenyl residue, the group

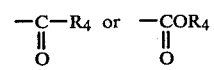

wherein $R_4$ is an alkyl residue having from one to twenty carbon atoms.

Cook U.S. Pat. No. 3,929,804 patented Dec. 30, 1975 discloses 4-piperidine acetamide compounds having the formula:

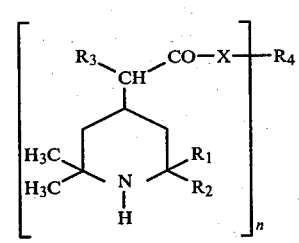

I wherein $R_1$ and $R_2$ are the same or different and each is a straight- or branched alkyl residue having from one to twelve carbon atoms, or $R_1$ and $R_2$, together with the carbon atom to which they are attached form a cycloalkyl group having from five to twelve carbon atoms;

$R_3$ is hydrogen, a straight- or branched alkyl residue having from one to four carbon atoms, an aralkyl residue having from seven to nine carbon atoms or a cycloalkyl group having from five or six carbon atoms;

$R_4$ is a metal ion or a hydrocarbyl residue having from two to twenty carbon atoms and being either unsubstituted or substituted by halogen or interrupted by one or more oxygen or sulphur atoms;

X is —O—, —S—, or >$NR_5$, wherein $R_5$ has the same significance as $R_3$; and n is 2, 3 or 4;

as well as salts of the amine function of the compounds of formula I.

Cook U.S. Pat. No. 3,939,168 patented Feb. 17, 1976 discloses closely similar compounds having a Y substituent on the piperidyl nitrogen atom, Y being alkyl, alkenyl, aralkyl or a group $$R_7-\underset{\underset{OH}{|}}{CH}-CH_2-$$

wherein $R_7$ is hydrogen, alkyl or phenyl.

Randell et al U.S. Pat. No. 3,939,170, patented Feb. 17, 1976 provides di-4-(3,4-dehydro-2,2,6,6-tetramethyl piperidinyl) sulphides, sulphoxides and sulphones having the formula:

[Chemical structure]

wherein

X is S, SO or $SO_2$ and Y and $Y^1$ are the same or different and each is H, OH, 0° or a straight- or branched-alkyl residue having from one to four carbon atoms, and salts thereof when Y and $Y^1$ are other than 0°.

Preferably X is S.

Smith et al U.S. Pat. No. 3,954,779, patented May 4, 1976 provides 4-(4'-hydroxycyclohexyl)2,2,6,6-tetramethyl piperidines and derivatives thereof having the formula:

[Chemical structure] I and salts thereof, wherein $R_1$, $R_2$, $R_3$ and $R_4$ are the same or different and each is hydrogen, an alkyl residue having from one to nine carbon atoms, a cycloalkyl residue having from five to fourteen carbon atoms or a cycloalkyl-alkyl residue having from seven to fourteen carbon atoms;

Y is hydrogen;

O an alkyl residue having from one to four carbon atoms, or an aralkyl residue having from seven to twelve carbon atoms; and Z is hydrogen, an unsubstituted or substituted alkyl residue having from one to twenty carbon atoms, an alkenyl or alkynyl residue having from two to twenty carbon atoms, a cycloalkyl residue having from five to twelve carbon atoms, an aralkyl residue having from seven to twelve carbon atoms, an aryl residue having from six to twelve carbon atoms, or the group having the formula:

$$-COZ_1$$

wherein $Z_1$ has the same significance as Z as hereinbefore defined or $Z_1$ is a group $-NR_5R_6$ wherein $R_5$ is hydrogen or an alkyl residue having from one to four carbon atoms and $R_6$ is hydrogen, an alkyl residue having from one to twenty carbon atoms, a cycloalkyl residue having from five to twelve carbon atoms, an aralkyl residue having from seven to twelve carbon atoms or an aryl residue having from six to twelve carbon atoms.

Cook U.S. Pat. No. 3,959,291, patented May 25, 1976 provides derivatives of substituted 2-piperidinyl-4'-ethyl alcohol having the formula:

[Chemical structure]

and salts thereof, wherein $R_1$ and $R_2$ are the same or different and each is an alkyl residue having from one to twelve carbon atoms, or $R_1$ and $R_2$, together with the carbon atom to which they are bound, form a cycloalkyl residue having from five to twelve carbon atoms in the ring;

Y is O, hydrogen, a straight- or branched-alkyl residue having from one to twenty carbon atoms, an alkenyl or alkynyl residue having from three to twelve carbon atoms, an aralkyl residue having from seven to twelve carbon atoms or a group having the formula:

$$-CH_2-\underset{\underset{R}{|}}{CH}-OH$$

wherein

R is hydrogen, or a methyl or phenyl residue, and $R_3$ is hydrogen, or a straight- or branched-chain alkyl residue having from one to twelve carbon atoms.

Cook U.S. Pat. No. 3,971,795, patented July 27, 1976 provides N-substituted piperidinylidene derivatives having the formula:

[Chemical structure] I wherein n is 1, 2, 3 or 4,

Y is hydrogen or a straight- or branched-alkyl residue having from one to twelve carbon atoms, an alkenyl residue having from three to twelve carbon atoms or an aralkyl residue having from seven to twelve carbon atoms and $R_1$ and $R_2$ are the same or different and each is a straight- or branched-alkyl residue having from one to twelve carbon atoms, or $R_1$ and $R_2$ together with the carbon atom to which they are attached form a cycloalkyl group having from five to twelve carbon atoms;

$R_3$ is hydrogen, a straight- or branched-alkyl residue having from one to four carbon atoms, an aralkyl residue having from seven to twelve carbon atoms, a cycloalkyl group having five or six carbon atoms;

$R_4$ is a hydrocarbyl residue having from one to twenty carbon atoms being either unsubstituted or substituted by halogen, or interrupted by one or more oxygen or sulphur atoms or $R_4$ is a metal ion, or, when n is 1, $R_4$, in addition, is hydrogen or has the structure:

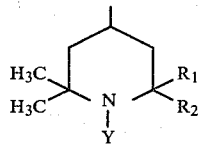

wherein
Y, $R_1$ and $R_2$ have their previous significance,
X is —O—, —S— or >NR$_5$
wherein
$R_5$ has the same significance as $R_3$ or when n is 1 in addition $R_5$ and $R_4$ together with the nitrogen atom to which they are bound form a heterocyclic residue having from four to ten carbon atoms;
as well as salts of the amine function of the compound of formula I.

Murayama et. al. U.S. Pat. No. 3,975,357, patented Aug. 17, 1976 provides 1-substituted piperidine derivatives having the formula:

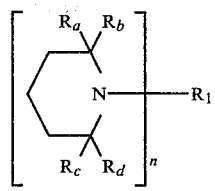

In the above formula, n represents 1 or 2.

$R_1$ represents when n=1, oxyl radical, hydroxy group, an alkyl group, a substituted alkyl group, an alkenyl group, an alkynyl group, an aralkyl group, a substituted aralkyl group or an acyl group, when n=2, an alkylene group (the alkylene chain may optionally be interrupted by an oxygen atom), 2-butenylene group, a group of the formula —CH$_2$COO—R$_7$—O—COCH$_2$—
wherein
$R_7$ represents an alkylene group or xylylene group, or a group of the formula —CH$_2$CH$_2$—O CO$-(-$R$_8)_m$ CO O—CH$_2$CH$_2$—
wherein
m represents 0 or 1,
$R_8$ represents an alkylene group (the alkylene chain may optionally be interrupted by a sulfur atom), an alkenylene group, phenylene group or 1,4-cyclohexylene group.

$R_a$ and $R_b$ represent methyl group or $R_a$ and $R_b$ together with carbon atom to which they are attached, form cyclohexyl group.

$R_c$ represents methyl group.

$R_d$ represents an alkyl group having one to five carbon atoms.

$R_c$ and $R_d$ together with carbon atom to which they are attached, may form cyclopentyl group, cyclohexyl group, a group of the formula:

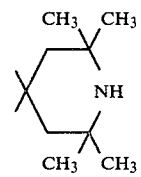

or a group of the formula

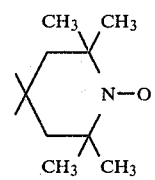

Murayama U.S. Pat. No. 3,975,462, patented Aug. 17, 1976 provides piperidine-spiro-hydantoin derivatives having the formula:

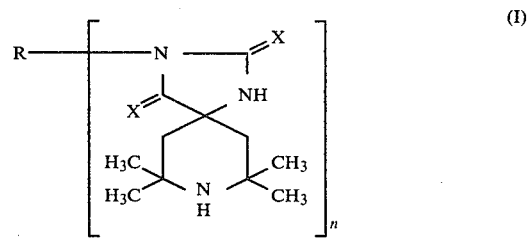

In the above formula (I), X represents oxygen atom or sulfur atom: n is an integer of 1 to 4 inclusive: and R represents when n is 1, an alkenyl group which may be substituted with halogen, an alkynyl group which may be substituted with phenyl, an aralkyl group which may be substituted with halogen, alkyl of one to four carbon atoms or halomethyl, a hydroxyalkyl group, an alkoxyalkyl group, an alkenyloxyalkyl group, an aryloxyalkyl group, an alkylthioalkyl group, an acyloxyalkyl group, an epoxyalkyl group, an N- alkyl-substituted aminoalkyl group, an alkoxycarbonyl alkyl group, an aliphatic acyl group, an alkoxycarbonyl group, a phosphino group which is substituted with phenoxy or alkoxy or a phosphinyl group which is substituted with phenoxy or alkoxy, when n is 2, an alkenylene group of four to eighteen carbon atoms, a dialkylene ether group, an aralkylene group, a bis-(acyloxyalkylene) group, or an alkylene-bis-(oxycarbonylalkyl) group, when n is 3, a tris-(acyloxyalkylene) group, an alkane-tris-(oxycarbonylalkyl) group or a group of the formula:

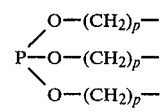

in which p is an integer of 1 to 8 inclusive and p's may be the same or different, and, when n is 4, a tetrakis (acyloxyalkylene) group.

Ávár et. al. U.S. Pat. No. 3,976,658, patented Aug. 24, 1976 provides pyrazole derivatives of the formula:

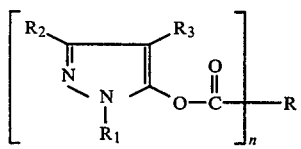

in which $R_1$ is a $C_{1-22}$ alkyl radical, a $C_{5-12}$ cycloalkyl radical, a $C_{6-12}$ cycloalkylalkyl radical, a $C_{7-12}$ aralkyl radical, of which the alkyl radical and the alkyl moiety of the cycloalkyl-alkyl radical are uninterrupted or interrupted by one or two sulphur atoms or by —COO—, and the aryl nucleus of the aralkyl radical is unsubstituted or substituted by a hydroxyl group and/or 1 or 2 $C_{1-12}$ alkyl radicals, or a phenyl group, unsubstituted or substituted by one or more substituents selected from one to two halogen atoms, a cyano group, a hydroxyl group, 1 or 2 $C_{1-12}$ alkyl radicals, 1 or 2 $C_{1-12}$ alkoxy radicals, a phenyl group and the radicals $R_4$—O— and $R_4$—$SO_2$—, wherein $R_4$ is a phenyl group, unsubstituted or substituted by 1 or 2 $C_{1-8}$ alkyl radicals, $R_2$, independently of $R_1$, has one of the significances of $R_1$, or is a cyano group or the radical —$COOR_5$, wherein $R_5$ is a $C_{1-12}$ alkyl radical, a $C_{5-12}$ cycloalkyl radical, a $C_{6-12}$ cycloalkyl-alkyl radical or a phenyl group, unsubstituted or substituted by a hydroxyl group and/or 1 or 2 $C_{1-8}$ alkyl radicals, $R_3$ is a hydrogen atom or one of the significances of $R_1$, —$COR_1$ or —$COOR_5$, n is 1, 2 or 3, and R, when n is 1, is a phenyl group, unsubstituted or substituted by a total of up to 3 substituents selected from 1 hydroxyl group, one to three halogen atoms, 1 phenyl group, 1 benzyl group, 1 phenoxy group, 1 to 3 alkyl radicals each containing one to eight carbon atoms and the sum of the carbon atoms not exceeding twelve, and 1 to 3 alkoxy radicals each containing one to twenty-two carbon atoms and the sum of the carbon atoms not exceeding twenty-two, or a monovalent naphthalene radical, or a monovalent radical of thiophene, benzothiophene, dibenzothiophene, furan, benzofuran, or dibenzofuran, and when n is 2, is a phenylene group, unsubstituted or substituted by a $C_{1-4}$ alkyl radical and/or a halogen atom, or a divalent naphthalene radical, or a divalent radical of thiophene or dibenzofuran, and when n is 3, is a 1,3,5-trivalent benzene radical.

In accordance with the instant invention, stabilizers for organic polymeric materials are provided, comprising a phosphonic acid ester, a phenolic antioxidant, and a 2,2,6,6-tetramethyl-4-piperidyl ether alcohol or ether having the general formula:

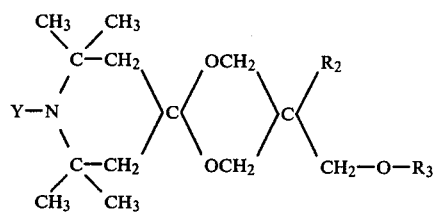

wherein $R_2$ is lower alkyl or hydroxyalkyl having from one to six carbon atoms;

$R_3$ is a hydrogen atom, provided $R_2$ is hydroxyalkyl;

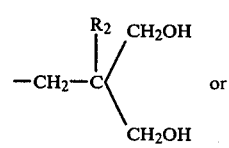

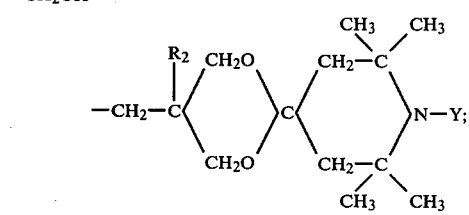

$R_2$ and $R_3$ may be taken together to form

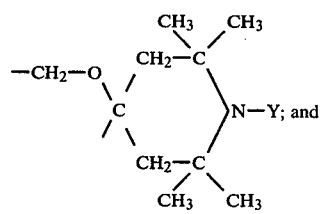

Y is selected from the group consisting of hydrogen and O.

The $R_2$ alkyl and hydroxy alkyl have from one to six carbon atoms. Examplary are methyl, ethyl, n-propyl, isopropyl, n-butyl, isobutyl, tertiary-butyl, secondary-butyl, n-amyl, isoamyl, tertiary-amyl, n-hexyl, isohexyl, secondary-hexyl, tertiary-hexyl; hydroxymethyl, hydroxyethyl, hydroxy-n-propyl, hydroxyisopropyl, hydroxy-n-butyl, hydroxyisobutyl, hydroxy-tertiary-butyl, hydroxy-secondary-butyl, hydroxy-n-amyl, hydroxyisoamyl, hydroxy-tertiary-amyl, hydroxy-n-hexyl, hydroxyisohexyl, hydroxy-secondary-hexyl, and hydroxy-tertiary-hexyl.

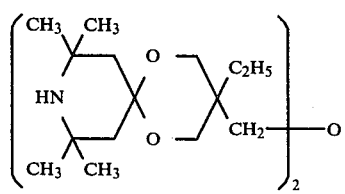

1.

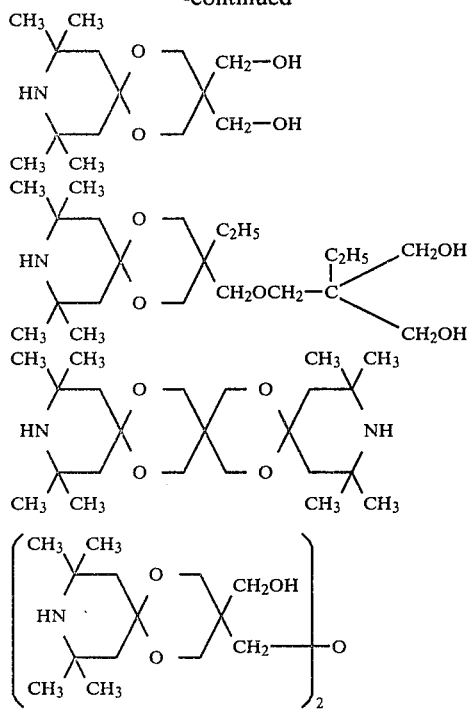

The 2,2,6,6-tetramethyl-4-piperidyl ether alcohols and ethers are for the most part known compounds. All are readily prepared using conventional procedures. The starting materials are either available or readily synthesized without difficulty. The corresponding 2,2,6,6-tetramethyl-4-hydroxy piperidine is used as a starting material for the 2,2,6,6-tetramethyl-4-piperidyl group $R_1$. This is reacted in the presence of an organic solvent and an alkali metal or an alkali metal alkoxide with one or more halide groups of the corresponding mono or polyhalide with a Z nucleus. The hydroxy group of the piperidine becomes etherified with the halide groups, forming the 4-piperidinyl ether alcohol or ether of the invention:

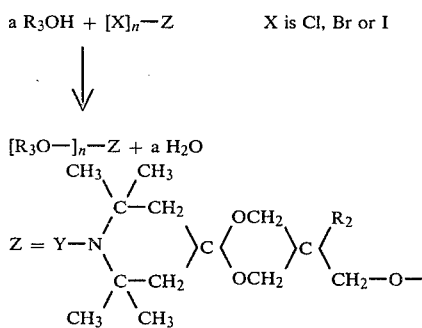

The stabilizer mixtures of the invention in addition to the 2,2,6,6-tetramethyl-4-piperidyl ether alcohol or ether include a phosphonic acid ester and a phenolic antioxidant. Such combinations are complementary, and impart an enhanced resistance of the polymer to deterioration when exposed to light and/or heat. Such stabilizing effectiveness is enhanced as compared to only one or two components of the three-component stabilizer mixtures of the invention.

The phosphonic acid esters of the invention have the formula:

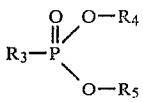

wherein
$R_3$, $R_4$ and $R_5$ are selected from the group consisting of alkyl and alkenyl having from about one to two to about thirty carbon atoms; cycloalkyl and cycloalkenyl having from three to about twelve carbon atoms; aryl alkaryl and aralkyl having from six to about thirty carbon atoms, and alkoxy alkylene or polyoxyalkylene in which the alkoxy and alkylene have from one or two to about thirty carbon atoms, and $R_4$ and $R_5$ taken together as an alkylene, cycloalkylene or arylene having from two to about thirty carbon atoms.

The R alkyl can be methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, octyl, 2-ethylhexyl, nonyl, isononyl, decyl, dodecyl, tridecyl, tetradecyl, hexadecyl, octadecyl, and eicosyl; the R alkenyl can be vinyl, allyl, linoleyl, linolenyl, ricinoleyl and oleyl. The aryl, alkaryl or aralkyl can be phenylene, naphthylene, phenmethyl, phenethyl, phenpropyl, phenbutyl, naphthethyl phenethylene, phenpropylene and phenbutylene.

The cycloalkyl and cycloalkylene include a cycloaliphatic ring of from three to eight carbon atoms in a monocyclic or bicyclic structure, optionally with an alkyl or alkylene substituent, and include cyclopropyl, cyclobutyl, cyclopentyl, cyclohexyl, cycloheptyl, cyclooctyl, bicyclic cycloheptyl, bicyclic cyclooctyl, methyl cyclopentyl, methyl cyclohexyl, cyclohexylidene, cyclopentylidene, cyclohexylene and cycloheptylene.

The alkoxyalkylene and polyoxyalkylene include ethoxyethylene, methoxyethylene, propoxypropylene, ethoxypropylene, methoxyethylene oxyethylene, ethoxyethylene oxyethylene, propoxypropylene oxypropylene.

Exemplary phosphonate esters include diphenyl benzenephosphonate, di-2-ethylhexyl-2-ethylhexylphosphonate, di-(t-octylphenyl)-t-octylphenylphosphonate, diphenyl-2-ethylhexylphosphonate, di-2-ethylhexyl-isobutylphosphonate, dipropyl-propylphosphonate, di-α-naphthyl-α-naphylphosphonate, dicyclohexyl-cyclohexylphosphonate, ditolyltolylphosphonate, di-benzyl-benzylphosphonate, di-(nonyl phenyl)-2-ethylhexylphosphonate, di-(dimethylphenyl)-dimethylphenylphosphonate, dimethylbenzylphosphonate, dibutyl-benzylphosphonate, dioctyl-benzylphosphonate, distearyl-benzylphosphonate, butyloctyl-benzylphosphonate, diphenyl-benzylphosphonate, phenyloctyl-benzylphosphonate, neopentyl-benzylphosphonate, dioleyl-benzylphosphonate, di-(nonylphenyl)-laurylphosphonate, di-(octylphenyl)n-octylphosphonate, distearyl-stearylphosphonate, di-(cyclohexylphenyl)lauryl phosphonate, di-(nonylphenyl)-$C_{12}$-$C_{15}$ mixed alkylphosphonate, di-(octylphenyl)-$C_{20}C_{28}$ mixed alkylphosphonate, neopentyl-laurylphosphonate, neopentyl-stearylphosphonate, di-(butyl-carbitol)-benzylphosphonate and di-(ethyl-cellosolve)-laurylphosphonate.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

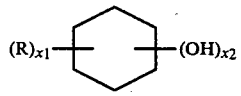

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and

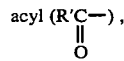

where R' is aryl, alkyl or cycloalkyl.

$x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

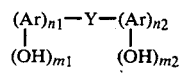

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and

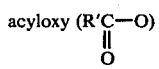

where R' is aryl, alkyl or cycloalkyl, or thiohydrocarbon groups having from one to about thirty carbon atoms, and

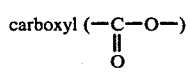

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

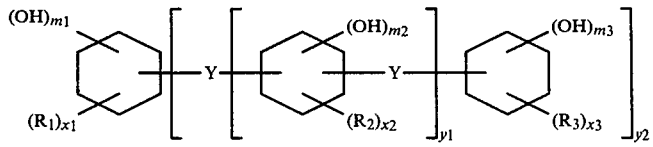

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valency Y groups, connecting more than four Ar groups can also be used. According to their constitution, the Y groups can be assigned to sub-genera as follows:

(1) Y groups where at least one carbon in a chain or cyclic arrangement connect the aromatic groups, such as:

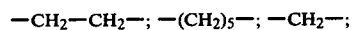
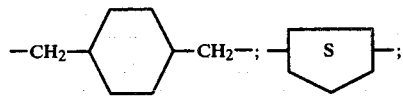
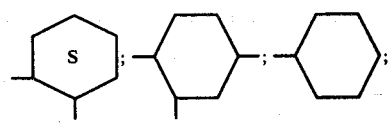
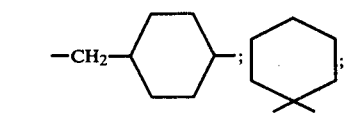
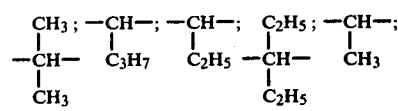
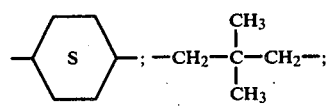
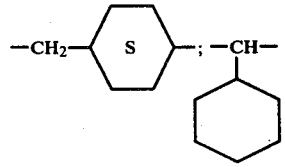
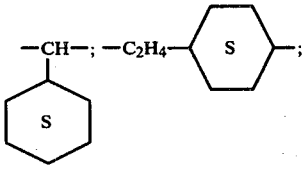
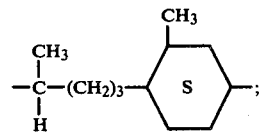
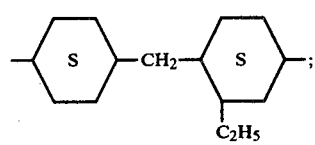

-continued

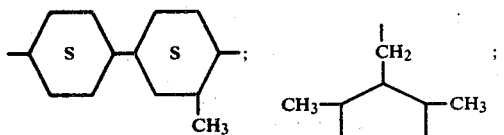
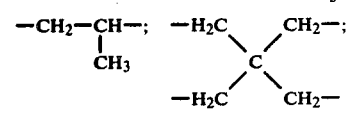
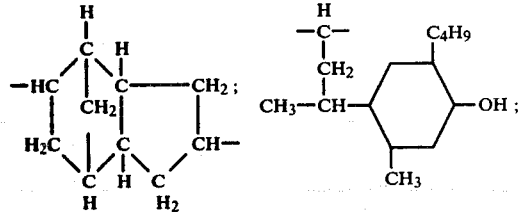

(2) Y groups where only atoms other than carbon link the aromatic rings, such as

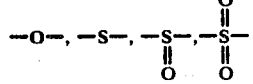

and —(S)$_x$— where x is a number from one to ten;

(3) Y groups made up of more than a single atom including both carbon and other atoms linking the aromatic nuclei, such as:

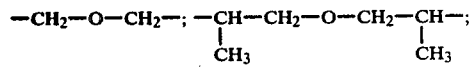
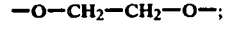
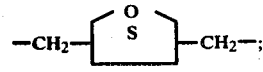
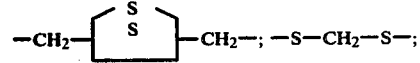
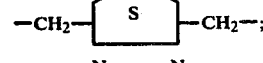
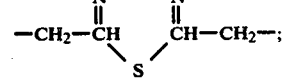
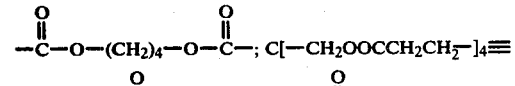
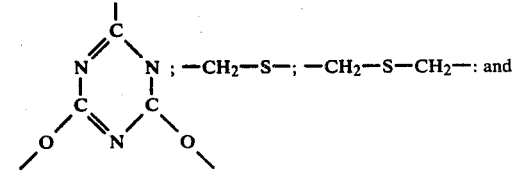

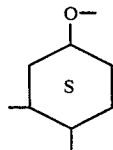

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol, monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenyl-phenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxycinnamate, 4-benzyloxy-phenol, p-acetylaminophenol, p-stearyl-aminophenol methyl-p-hydroxybenzoate, p-di-chlorobenzoyl-aminophenol, p-hydroxysalicyl anilide, stearyl-(3,5-di-methyl-4-hydroxy-benzyl) thioglycolate, stearyl-β-(4-hydroxy-3,5-di-t-butylphenyl) propionate, distearyl-3,5-di-t-butyl-4-hydroxybenzylphosphonate, and distearyl (4-hydroxy-3-methyl-5-t-butyl benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenol)-propane, methylene-bis-(p-cresol), 4,4'-benzylidene bis-(2-tertiary-butyl-5-methyl-phenol), 4,4'cyclohexylidene bis-(2-tertiary-butylphenol), 2,2'-methylene-bis-(4-methyl-6-(1'-methylcyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl) butane, ethylene bis-(p-cresol), 4,4'-oxobis-phenol, 4,4'-oxobis (3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol) 2,2'-methylene-bis-(4-methyl-6-(1'-methyl-cyclohexyl)phenol), 4,4'cyclohexylene bis-(2-tertiary-butyl-phenol), 2,6-bis-(2'-hydroxy-3'-t-butyl-5'-methyl-benzyl)-4-methyl-phenol, 4,4'-oxobis (naphthalene-1,5-diol), 1,3'-bis-(naphthalene-2,5-diol) propane, and 2,2'-butylene bis-(naphthalene-2,7-diol), (3-methyl-5-tert-butyl-4-hydroxy-phenyl)-4'-hydroxy-phenyl) propane, 2,2'-methylene-bis-(4-methyl-5-isopropylphenol), 2,2'methylene bis-(5-tert-butyl-4-chlorophenol), (3,5-di-tert-butyl-4-hydroxyphenyl)-(4'-hydroxyphenyl) ethane, (2-hydroxyphenyl)-(3',5'-di-tert-butyl-4',4-hydroxyphenyl) ethane, 2,2'-methylene bis-(4-octylphenol), 4,4'-propylene bis-(2-tert-butylphenol), 2,2'-isobutylene bis-(4-nonyl-phenol), 2,4-bis-(4-hydroxy-3-t-butylphenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl) thiazolo-(5,4-d) thiazole, 2,2'-bis-(3-methyl-5-t-butyl-4-hydroxyphenyl) thiazolo-(5,4-d)-thiazole, 4,4'-bis-(4-hydroxy-phenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol bis-(3-tert-butyl-4-hydroxyphenoxy acetate), 1,4-butanedio bis-(3-tert-butyl-4-hydroxyphenoxy acetate), pentaerythritoltetra (4-hydroxyphenol propionate), 2,4,4'-tri-hydroxy benzophenone, bis-(2-tert-butyl-3-hydroxy-5-methylphenyl) sulfide, bis-(2-tert-butyl-4-hydroxy-5-methylphenyl sulfide, bis-(2-tert-butyl-4-hydroxy-5-methyl-phenyl sulfoxide), bis-(3-ethyl-5-tert-butyl-4-hydroxy benzyl) sulfide, bis-(2-hydroxy-4-methyl-6-tert-butyl phenyl) sulfide, 4,4'-bis-(4-hydroxy-phenol) pentanoic acid octadecyl thiopropionate ester, 1,1,3-tris-(2'-methyl-4-hydroxy-5'-tert-butylphenyl butane, 1,1,3-tris-(1-methyl-3-hydroxy-4-tert-butylphenyl) butane, 1,8-bis-(2-hydroxy-5-methyl-benzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butyl phenol)-bis-[3,3-bis-(4-hydroxy-3-t-butylphenyl) butyric acid] glycol ester, 4,4'-butylidene bis-(6-t-butyl-m-cresol), 1,1,3-tris-(2-methyl-4-hydroxy-5-,t-butylphenyl) butane, 1,3,5-tris-(3,5-di-t-butyl-4-hydroxybenzyl)-2,4,6-trimethylbenzene, tetrakis [methylene-3(3,5-di-t-butyl-4-hydroxyphenyl) propionate] methane, 1,3,5-tris-(3,5-di-t-butyl-4-hydroxybenzyl) isocyanurate, 1,3,5-tris-(3,5-di-t-butyl-4-hydroxyphenyl) propionyl-oxyethyl isocyanurate, 2-octylthio-4,6-di-(4-hydroxy-3,5-di-t-butyl) phenoxy-1,3,5-triazine, 4,4'thiobis (6-t-butyl-m-cresol) and pentaerythritol hydroxyphenyl propionate.

A particularly desirable class of polyhydric polycyclic phenols are the dicyclopentadiene polyphenols, which are of the type:

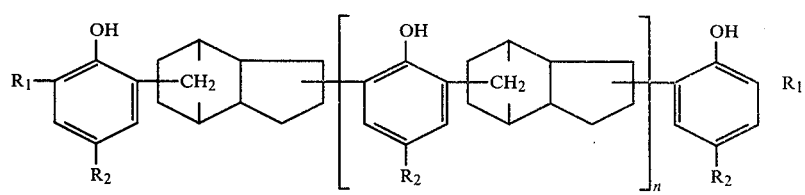

in which

R$_1$ and R$_2$ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

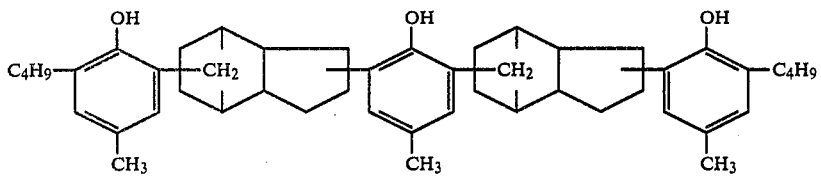

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135 and British Pat. No. 961,504.

In addition to these three ingredients, which are the essential ingredients, the stabilizer compositions of the invention can include other stabilizers conventionally used as heat and/or light stabilizers for synthetic resins, including thiodipropionic acid esters, polyvalent metal salts of organic acids, organic triphosphites and acid phosphites.

The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

$$R_1O[OCCH_2CH_2SCH_2CH_2COOXO]_nOCCH_2CH_2-S-CH_2CH_2COOZ$$

wherein

Z is hydrogen, $R_2$ or M;

n is the number of thiodipropionic acid ester units in the chain; and

X is a bivalent hydrocarbon group of the type of $R_1$; the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) $R_1OOCCH_2CH_2SCH_2CH_2COOH$ (b) $R_1OOCCH_2CH_2SCH_2CH_2COOR_2$ (c) $R_1O[OCCH_2CH_2SCH_2CH_2COOX-O]_n\text{-}OCCH_2CH_2SCH_2CH_2COOZ$ (d) $[R_1OOCCH_2CH_2SCH_2CH_2COO]_2M$ In the above formulae, $R_1$ and $R_2$, M, X and Z are the same as before, In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene

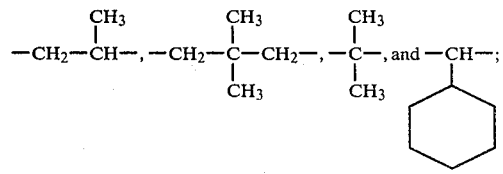

-continued arylene radicals such as phenylene , methylenephenylene , dimethylene phenylene, ;

and alicyclene radicals, such as cyclohexylene 

and cyclopentylene 

As exemplary of the thiodipropionic acid esters which can be used, there can be mentioned the following: monolauryl thiodipropionic acid, dilauryl thiodipropionate, butyl stearyl thiodipropionate, di-(2-ethylhexyl)-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual type of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

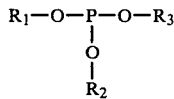

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

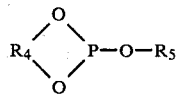

in which R₄ is a bivalent organic radical selected from the group consisting of alkylene, arylene, aralkylene, alkarylene and cycloalkylene radicals having from two to about thirty carbon atoms, and R₅ is a monovalent organic radical as defined above in the case of R₁, R₂ and R₃.

R₅ is hydrogen or a cation, in the case of the acid phosphites.

Also useful organic triphosphites are mixed heterocyclic-open chain phosphites of the type:

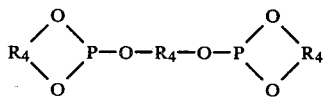

More complex triphosphites are formed from trivalent organic radicals, of the type:

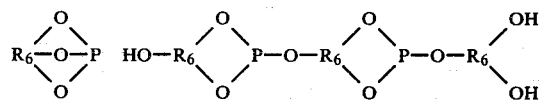

in which R₆ is a trivalent organic radical of any of the types of R₁ to R₅, inclusive, as defined above.

A particularly useful class of complex triphosphites are the tetraoxadiphosphaspiro undecanes of the formula:

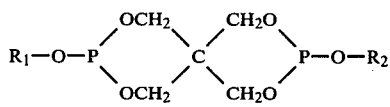

where R₁ and R₂ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

In the case of the acid phosphites, one or both of R₁ and R₂ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

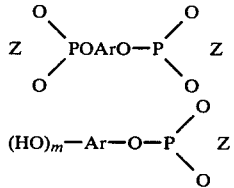

in which Ar is a mono or bicyclic aromatic nucleus and m is an integer of from 0 to about 5. Z is one or a plurality of organic radicals as defined above for R₁ to R₆, taken singly or together in sufficient number to satisfy the valences of the two phosphite oxygen atoms.

One or both Z radicals is also hydrogen, in the case of the acid phosphites, and can include additional bicyclic aromatic groups of the type (HO)ₘ—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenylethyl) phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritoldiphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di (methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro (5,5)-undecane (where the (polyethoxy) ethyloxy group has an average molecular weight of 350) 3,9-di(methoxy (polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis (2-tertiary butyl-5-methyl-phenol)) isooctyl phosphite, mono (4,4'-thio-bis (2-tertiary-butyl-5-methyl-phenol)) di-phenyl phosphite, tri-(4,4'-n-butylidene-bis(2-tertiary-butyl-5-methyl-phenol)) phosphite, (4,4'-benzylidene-bis (2-tertiary-butyl-5-methyl-phenol)) di-phenyl phosphite, isooctyl 2,2'-bis (-parahydroxyphenyl) propane phosphite, decyl 4,4'-n-butylidene-bis (2-tertiary-butyl-5-methylphenol) phosphite, tri-4,4'-thiobis(2-tertiary-butyl-5-methylphenol) phosphite, 2-ethylhexyl-2,2'-methylene-bis(4-methyl-6,1'-methylcyclohexyl) phenol phosphite, tri (2,2'-bis-(para-hydroxyphenyl) propane) phosphite, tri (4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl 4,4'-n-butylidene-bis(2-tertiary butyl-5-methyl phenyl) diphosphite, tetra-isooctyl 4,4'-thiobis (2-tertiary butyl-5-methyl phenyl) diphosphite, 2,2'-methylene-bis(4-methyl 6,1'-methyl cyclohexyl phenyl) polyphosphite, isooctyl-4,4'-isopropylidene-bis-phenyl-polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butylidene bis (2-tertiary-butyl-5-methylphenyl) diphosphite, tetratridecyl-4,4'-isopropylidene bisphenyl diphosphite, hexa-tridecyl butane-1,1,3-tris (2'-methyl-5'-tertiary-butylphenyl-4'-) triphosphite.

Exemplary acid phosphites are di(phenyl) phosphite, monophenyl phosphite, mono-(diphenyl) phosphite, dicresyl phosphite, di-(o-isooctylphenyl) phosphite, di(p-ethylhexylphenyl) phosphite, di(p-t-octylphenyl) phosphite, di(dimethylphenyl) phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-(2-phenyl ethyl) phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis (4,4'-thio-bis (2-tertiary-butyl-5-methyl-phenol)) phosphite, (4,4'-thio-bis (2-tertiary-butyl-5-methyl-phenol)) phenyl phosphite, bis (4,4'-n-butylidene-bis (2-tertiary-butyl-5-methyl-phenol)) phosphite, mono (4,4'-benzylidene-bis (2-tertiary-butyl-5-methyl-phenol)) phosphite, mono (2,2'-bis-(-parahydroxyphenyl) propane) phosphite, mono (4,4'-n-butylidene-bis (-2-tertiary-butyl-5-methyl-phenol) phosphite, bis (4,4'-thiobis (2-tertiary-butyl-5-methylphenol)) phosphite, mono-2-ethylhexyl-mono-2,2'methylene-bis (4-methyl-6,1'methylcyclohexyl) phenol phosphite, bis (2,2'-bis-(para-hydroxyphenyl) propane) phosphite, monoisooctyl mono (4,4'thio-bis(2-tertiary-butyl-5-methyl-phenol))phosphite, isooctyl-(2,6-bis(2'-hydroxy-3,5-dinonylbenzyl)-4-nonyl phenyl))phosphite, tri-tridecyl 4,4'-n-butylidene-bis(2-tertiary-butyl-5-methyl phenyl)diphosphite, triisooctyl 4,4'-thiobis(2-tertiary-butyl-5-methyl phenyl)diphosphite, bis (2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butylidene bis(2-tertiarybutyl-5-methylphenyl)diphosphite, di-tridecyl-4,4'-isopropylidene bisphenyl diphosphite, tetra-tridecyl butane-1,1,3-tris(2'-methyl-5'-tertiary-butylphenyl-4-)triphosphite.

The 2,2,6,6-tetrasubstituted-4-piperidyl ether alcohol or ether phosphonic acid-phenolic antioxidant-containing stabilizer compositions of the invention are effective stabilizers to enhance the resistance to deterioration due to heat and/or light of synthetic polymeric materials which are susceptible to such degradation.

The stabilizer systems of the invention are especially effective stabilizers for olefin polymers such as polyethylene, polypropylene, polybutylene, polypentylene, polyisopentylene, and higher polyolefins.

Olefin polymers on heating and working in air undergo degradation, resulting in a loss of melt viscosity.

The stabilizer systems can be employed with any olefin polymer, including low-density polyethylene, high-density polyethylene, polyethylenes prepared by the Ziegler-Natta process, polypropylenes prepared by the Ziegler-Natta process, and by other polymerization methods from propylene, poly(butene-1), poly(pentene-1), poly(3-methylbutene-1) poly(4-methylpentene-1), polystyrene, and mixtures of polyethylene and polypropylene with other compatible polymers, such as mixtures of polyethylene and polypropylene, and copolymers of such olefins, such as copolymers of ethylene, propylene, and butene, with each other and with other copolymerizable monomers, which present the instability problem that is resolved by the stabilizer system of the invention. The term "olefin polymer" encompasses both homopolymers and copolymers.

Polypropylene solid polymer can be defined in a manner to differentiate it from other polyolefins as having a density within the range from 0.86 to 0.91, and a melting point above 150° C. The stabilizer system of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade name PRO-FAX, and having a softening or hot-working temperature of about 350° F., is an example of a sterically regular polypropylene polymer.

Mixtures of polypropylene with other compatible polymers and copolymers of propylene with copolymerizable monomers not reactive with the polypropylene stabilizer combination can also be stabilized, for example, mixtures of polyethylene and polypropylene, and copolymers of propylene and ethylene which have a sufficient amount of propylene to present the instability problem that is resolved by the stabilizer combinations of the invention.

The stabilizer combinations are also effective to enhance the resistance to light and/or heat degradation of polystyrene; polydienes, such as polybutadiene and polyisoprene; and copolymers of olefins and dienes with other ethylenically and acetylenically unsaturated monomers, such as ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsilon-caprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

A sufficient amount of the stabilizer combination is used to improve the resistance of the synthetic polymer to deterioration in physical properties, including, for example, discoloration, reduction in melt viscosity and embrittlement, under the conditions to which the polymer will be subjected. Very small amounts are usually adequate. Amounts within the range from about 0.001 to about 15% total stabilizers by weight of the polymer are satisfactory. Preferably, from 0.05 to 5% is employed, for optimum stabilization.

Inasmuch as all components are solids, the stabilizer systems of the invention are readily rendered in solid particulate form, comprising a blend of (a) a 2,2,6,6-tetramethyl-4-piperidyl ether alcohol or ether in an amount from about 90 to about 35 parts by weight;

(b) a phenolic antioxidant in an amount of from about 10 to about 35 parts by weight; and (c) a phosphonic acid ester in an amount of from about 10 to about 35 parts by weight.

The stabilizer compositions of the invention can be employed as the sole stabilizer or in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

Preferably, the stabilizer system is added to the synthetic polymer in an amount to provide in the polymer from about 0.01 to about 5% of the 2,2,6,6-tetramethyl-4-piperidyl carboxylic acid ether or ether alcohol, from about 0.001 to about 5% of the phenolic antioxidant and from about 0.001 to about 5% of the phosphonate ester.

More than 5% of the phenol and more than 15% of the total stabilizers may evidence a lessened stabilizing effect or even a depressing effect on stabilization at high temperatures above 275° C.

The stabilizer combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The following Examples illustrate preferred stabilizer systems of the invention.

EXAMPLES 1 and 2

A group of polyvinyl chloride resin compositions was prepared having the following formulation:

| Ingredient | Parts by Weight |
| --- | --- |
| Polyvinyl chloride | 100 |
| Dioctylphthalate | 50 |
| Ca stearate | 1.0 |
| Zn stearate | 0.1 |
| 2,6-Di-tertiary-butyl-p-cresol | 0.5 |
| Piperidyl ether or ether alcohol as shown in Table I | 0.5 |
| Phosphonate ester as shown in Table I | 0.5 |

This information was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light (denoted as Hours to Failure in Table I).

Heat stability was evaluated in a Geer forced air oven at 175° C., and the time to failure in minutes noted (denoted as Minutes to Failure in Table I).

This test was carried out for the stabilizers in accordance with the invention having the formulae indicated in Table I. The following results were obtained:

TABLE I

| Example No. | Piperidylether on ether alcohol | Phosphonate ester | Hours to Failure | Minutes to Failure |
| --- | --- | --- | --- | --- |
| Control 1 | None | None | 290 | 60 |
| Control 2 | None | Diphenyl benzene phosphonate | 320 | 60 |
| Control 3 | [structure: HN-piperidyl-OCC$_{10}$H$_{20}$CO-piperidyl-NH with CH$_3$ groups] | None | 550 | 60 |

TABLE I-continued

| Example No. | Piperidylether on ether alcohol | Phosphonate ester | Hours to Failure | Minutes to Failure |
|---|---|---|---|---|
| Control 4 | (structure: piperidine with HN, two CH groups, O-CH2-CH2-O ring) | Di-(nonylphenyl)lauryl phosphonate | 490 | 75 |
| 1 | (structure: 2,2,6,6-tetramethylpiperidine with HN, O-C(CH2OH)2) | Di-(nonyphenyl)lauryl phosphonate | 870 | 120 |
| 2 | (structure: bis-piperidyl ether alcohol dimer) | Di-(methyl cellosolve) benzyl phosphonate | 810 | 105 |

It is apparent that the stabilizer compositions in accordance with the invention are far superior to the controls containing no stabilizer or only one or two of the three-component stabilizer of the invention.

EXAMPLES 3 and 4

Polypropylene compositions were prepared using stabilizers of the invention and having the following formulation:

| Ingredient | Parts by Weight |
|---|---|
| Polypropylene | 100 |
| Stearyl β-(4-hydroxy-3,5-di-tert-butyl-phenyl) propionate | 0.3 |
| Piperidyl ether or ether alcohol as shown in Table II | 0.3 |
| Phosphonate ester as shown in Table II | 0.1 |

The composition was thoroughly blended in a Brabender Plastograph, and then compression-molded to form sheets 0.5 mm thick.

Pieces 2.5 cm² were cut off from the sheets and exposed to ultraviolet light in a Weather-O-Meter.

Heat stability was evaluated in an air circulating oven at 160° C.

In each test, the time in hours required for the sheet to develop a noticeable discoloration and/or embrittlement was noted as the hours to failure.

The results obtained are shown in Table II.

TABLE II

| | | | Hours to Failure | |
|---|---|---|---|---|
| Example No. | Piperidyl ether or ether alcohol | Phosphonate ester | (Weather-O-Meter) | (Oven) |
| Control 1 | None | Di-(octylphenyl) octyl-phosphonate | 280 | 830 |
| Control 2 | 2-Hydroxy-4-methoxybenzophenone | Di(octylphenyl) octyl-phosphonate | 370 | 750 |
| Control 3 | (structure: tri-ester with three piperidyl ether groups attached via CH2-COO-CH2, CHCOO-CH2, CH2=CCOO-CH2 linkages to tetramethylpiperidine ether) | Tris-(nonylphenyl) phosphite | 350 | 850 |

TABLE II-continued

| Example No. | Piperidyl ether or ether alcohol | Phosphonate ester | Hours to Failure (Weather-O-Meter) | (Oven) |
|---|---|---|---|---|
| Control 4 | [structure: piperidine with spiro dioxane, HN] | Diphenyl benzyl phosphonate | 310 | 770 |
| 3 | [structure: bis-(tetramethylpiperidinyl ether) with neopentyl glycol linker, HN] | Di-(phenylcarbitol) phenyl phosphonate | 830 | 1090 |
| 4 | [structure: tetramethylpiperidinyl ether with CH₂OCH₂-C(C₂H₅)(CH₂OH)₂ group, HN] | Diphenyl benzyl phosphonate | 900 | 1010 |

It is apparent from the above results that the compounds of the invention are superior stabilizers in enhancing the resistance of the polypropylene polymer composition to deterioration in the presence of ultraviolet light.

EXAMPLE 5

Ethylene-vinyl acetate copolymer compositions were prepared using a stabilizer of the invention and having the following formulation:

| Ingredient | Parts by Weight |
|---|---|
| Ethylene-vinyl acetate copolymer | 100 |
| Tetrakis-(methylene-3-(3',5'-di-t-butyl-4-hydroxyphenyl)propionate) methane | 0.1 |
| Piperdyl ether or ether alcohol as shown in Table III | 0.25 |
| Phosphonate ester as shown in Table III | 0.25 |

The stabilizer was blended with the polymer on a two-roll mill at 120° C., and sheets 1 mm thick were then compression molded at 120° C. from the resulting blend. Pieces 2.5 cm² were cut off from the sheets and exposed to ultraviolet light in a Weather-O-Meter for 500 hours. At the start and at the conclusion of the test, the tensile strength of the sheet samples was determined.

Heat stability was evaluated in a Geer forced air oven at 175° C. Initial color was determined using a Hunter color difference meter.

The results are given in Table III as % retention of the initially determined tensile strength, minutes to failure in the oven test, and initial yellowness:

TABLE III

| Example No. | Piperidyl ether or ether alcohol | Phosphonate ester | % Retention of Tensile Strength | Oven Heating Minutes to Color Failure Oven | Color |
|---|---|---|---|---|---|
| Control 1 | None | None | 50 | 60 | 30 |
| Control 2 | None | Neopentyl lauryl phosphonate | 58 | 75 | 20 |
| Control 3 | [structure: bis-tetramethylpiperidine linked via -OOCC₂H₄- to neopentyl glycol spiro dioxane to -H₄C₂COO-, with NH groups] | None | 66 | 60 | 27 |
| Control 4 | [structure: piperidine with spiro dioxane, HN] | Distearyl benzyl phosphonate | 70 | 75 | 22 |

TABLE III-continued

| Example No. | Piperidyl ether or ether alcohol | Phosphonate ester | % Retention of Tensile Strength | Oven Heating Minutes to Color Failure Oven | Color |
|---|---|---|---|---|---|
| 5 | [Structure: bis-piperidyl diether with CH₃ groups, HN and NH, linked through O—O bridges] | Distearyl benzyl phosphonate | 79 | 115 | 10 |

It is apparent from the results that the stabilizer composition in accordance with the invention is superior in enhancing the resistance of the ethylene-vinyl acetate copolymer to deterioration in the presence of ultraviolet light, and at elevated temperature.

EXAMPLE 6

High density polyethylene compositions were prepared using a stabilizer of the invention, and having the following formulation:

| Ingredient | Parts by Weight |
|---|---|
| High-density polyethylene | 100 |
| Calcium stearate | 1 |
| Thiodiglycol bis-(4-hydroxy-3,5-di-t-butylphenyl propionate) | 0.2 |
| Piperidyl ether or ether alcohol as shown in Table IV | 0.25 |
| Phosphonate ester as shown in Table IV | 0.2 |

The stabilizer was blended with the polymer on a two-roll mill and sheets 0.5 mm thick were prepared by compression molding of the blend. Pieces 2.5 cm² were cut off from the sheets, and exposed in a Weather-O-Meter to ultraviolet light.

Heat stability was evaluated in a Geer oven at 150° C.

In each case the time in hours when degradation set in, as determined by a significant discoloration and/or embrittlement, was noted as hours to failure, and the results are reported in Table IV:

TABLE IV

| Example No. | Piperidyl ether or ether alcohol | Phosphonate ester | Hours to Failure (Weather-O-Meter) | (Oven) |
|---|---|---|---|---|
| Control 1 | None | Di-(octylphenyl)octylphenyl phosphonate | 370 | 150 |
| Control 2 | [Structure: [HO—(t-Bu)₂—C₆H₂—CH₂]₂—C—COOCH₂—CH—O—piperidyl with CH₃ groups and NH]₂ | None | 600 | 120 |
| Control 3 | 2-(2'-hydroxy-5'-methylphenyl) benzotriazole | Di-(cyclohexylphenyl) laurylphosphonate | 580 | 410 |
| Control 4 | [Structure: piperidyl diether with HN, CH₃ groups, O—O bridges] | Dioctylbenzyl phosphonate | 520 | 360 |
| 6 | [Structure: piperidyl diether with HN, CH₃ groups, with CH₂—OH, CH₂—OH substituents] | Dilauryl benzyl phosphonate | 960 | 330 |

The stabilizer of the invention is clearly superior to the controls in enhancing resistance of the polyethylene to degradation under ultraviolet light and at elevated temperature.

EXAMPLE 7

Acrylonitrile-butadiene-styrene terpolymer resin compositions were prepared using a stabilizer of the invention and having the following formulation:

| Ingredient | Parts by Weight |
|---|---|
| Acrylonitrile-butadiene-styrene terpolymer | 100 |
| 4,4'-n-Butylidene bis-(2-t-butyl-5-methylphenol) | 0.1 |
| Zinc stearate | 0.5 |
| Piperdyl ether or ether alcohol as shown in Table V | 0.3 |

-continued

| Ingredient | Parts by Weight |
|---|---|
| Phosphonate ester as shown in Table V | 0.2 |

The stabilizer was blended with the resin on a two-roll mill, and sheets 2.5 mm thick were prepared by compression molding of the resulting blend. Pieces 2.5 cm² were cut off from the sheets, and subjected to ultraviolet light in a Weather-O-Meter for 800 hours. Tensile strength before and after the test exposure was determined, and the results reported as the percent of tensile strength retained, at the end of this time, in Table V.

Heat stability was evaluated by heating at 210° C. under a stress of 50 kg/cm² for ten minutes, and then noting color on a scale from 1 to 10 in which 10 is brown and 1 is white. Color is reported in Table V.

EXAMPLE 8

Polyamide resin compositions were prepared using a stabilizer of the invention and having the following formulation:

| Ingredient | Parts by Weight |
|---|---|
| Poly-epsilon-caprolactam | 100 |
| Tetrakis-(methylene-3-(3,5-di-t-butyl-4-hydroxyphenyl) propionate) methane | 0.1 |
| Piperidyl ether or ether alcohol as shown in Table VI | 0.2 |
| Phosphonate ester as shown in Table VI | 0.1 |

The stabilizer was blended with the finely powdered poly-epsilon-caprolactam in a ball mill for fifteen min-

TABLE V

| Example No. | Piperidyl ether or ether alcohol | Phosphonate ester | % Retention of Tensile Strength | Color of sheet After Heating |
|---|---|---|---|---|
| Control 1 | None | None | 40 | 9 |
| Control 2 | [N—CH₂COO—(2,2,6,6-tetramethylpiperidine-4-yl)NH]₃ | None | 53 | 9 |
| Control 3 | None | Di-(octylphenyl) benzyl phosphonate | 45 | 6 |
| Control 4 | HN(2,2,6,6-tetramethylpiperidine spiro bis-dioxane) | Diphenyl benzyl phosphonate | 49 | 7 |
| 7 | [HN(2,2,6,6-tetramethylpiperidine spiro dioxane with C₂H₅ and CH₂—O)]₂ | Diphenyl benzyl phosphonate | 81 | 3 |

It is apparent from the data that the stabilizer of the invention is superior to the controls.

utes, and the resulting powder was then compression-molded at 250° C. to form sheets 0.5 mm thick. Pieces 2.5 cm² were cut out from the sheets, and exposed to ultraviolet light in a Weather-O-Meter for 120 hours. At the conclusion of the test period, the color of the sheets was noted. The color was also noted after heating at 225° C. for thirty minutes in a Geer oven.

TABLE VI

| Example No. | Piperidyl ether or ether alcohol | Phosphonate ester | Color of Sheet after Irradiation | Color of Sheet after Heating |
|---|---|---|---|---|
| Control 1 | None | None | Dark brown | Dark brown |

TABLE VI-continued

| Example No. | Piperidyl ether or ether alcohol | Phosphonate ester | Color of Sheet after Irradiation | Color of Sheet after Heating |
|---|---|---|---|---|
| Control 2 | [Structure: pentaerythritol-like core with four 2,2,6,6-tetramethylpiperidyl ester groups: HN-piperidyl-OOC-CH₂-CH(COO-piperidyl-NH)-CH(COO-piperidyl-NH)-CH₂-COO-piperidyl-NH] | None | Yellow | Dark brown |
| Control 3 | [Structure: 2,2,6,6-tetramethyl-4-piperidyl spiro dioxane (HN-piperidine with spiro -O-CH₂-CH₂-O- ring)] | None | Light brown | Dark brown |
| 8 | [Structure: bis(2,2,6,6-tetramethyl-4-piperidyl spiro) with C₂H₅, CH₂ linker, shown as ( )₂ dimer] | Di-(o-cyclohexylphenyl) o-cyclohexylphenyl phosphonate | Light yellow | Pale yellow |

It is apparent that the stabilizer of the invention is an effective ultraviolet light and heat stabilizer for polyamide resins.

EXAMPLE 9

Polybutylene terephthalate resin compositions were prepared having the following compositions:

| Ingredient | Parts by Weight |
|---|---|
| Polybutylene terephthalate | 100 |
| 1,3,5-tris-(3,5-di-t-butyl-4-hydroxy benzyl)-2,4,6-trimethyl benzene | 0.1 |
| Pipendyl ether or ether alcohol as shown in Table VII | 0.4 |
| Phosphonate ester as shown in Table VII | 0.5 |

The compositions were extruded to form pellets, and then test pieces were molded from the pellets by injection molding at 270° C. Test pieces were irradiated with ultraviolet light for 500 hours in a Weather-O-Meter. Other test pieces were heated in an air oven at 150° C. for 240 hours to determine heat stability. Tensile strength before and after the test was determined, and the percent tensile strength retained in each test is given in Table VII:

TABLE VII

| Example No. | Piperidyl ether or ether alcohol | Phosphonate ester | % Retention of Tensile Strength (irradiation) | % Retention of Tensile Strength (heating) |
|---|---|---|---|---|
| Control 1 | None | None | 47 | 62 |
| Control 2 | None | Di-(octylphenyl) benzyl phosphonate | 52 | 71 |
| Control 3 | [Structure: 2,2,6,6-tetramethyl-4-piperidyl spiro dioxane (HN-piperidine with spiro -O-CH₂-CH₂-O- ring)] | Dioctyl octyl phosphonate | 61 | 73 |

TABLE VII-continued

| Example No. | Piperidyl ether or ether alcohol | Phosphonate ester | % Retention of Tensile Strength (irradiation) | (heating) |
|---|---|---|---|---|
| 9 | [structure: piperidyl ether alcohol with HN, CH3 groups, O, C2H5, CH2OCH2-C, CH2OH groups] | Dilauryl lauryl phosphonate | 86 | 81 |

It is apparent that the stabilizers of the invention are effective ultraviolet light and heat stabilizers for polyester resins.

ing the yellowness as percent increase in yellowness from the initial color.

The results are shown in Table VIII:

TABLE VIII

| Example No. | Piperidyl ether or ether alcohol | Phosphonate ester | Increase in Yellowness % |
|---|---|---|---|
| Control 1 | [norbornene structure with two COO-piperidyl (CH3, NH, CH3) groups] | None | 18 |
| Control 2 | [spiro piperidyl ether structure with HN, CH3, O] | None | 24 |
| 10 | [bis-piperidyl ether structure with HN, CH3, O groups and NH] | Diphenyl stearyl phosphonate | 8 |

EXAMPLE 10

Polypropylene compositions were prepared using a stabilizer system of the invention and having the following formulation:

| Ingredient | Parts by Weight |
|---|---|
| Polypropylene | 100 |
| 1,3,5-tris-(3,5-di-t-butyl-4-hydroxybenzyl) isocyanurate | 0.1 |
| Piperidyl ether or ether alcohol as shown in Table VIII | 0.3 |
| Phosphonate ester as shown in Table VIII | 0.2 |

The above ingredients were thoroughly blended on a Brabender Plastograph and then compression-molded to form a sheet 0.5 mm thick. Pieces 2.5 cm² were cut off from the sheets, and then resistance to gas staining with NO$_x$ gas was measured by determining the yellowness of the sheet after immersion in an NO$_x$ gas atmosphere for 72 hours at room temperature by a Hunter calorimeter, comparing this to initial color, and report- The effectiveness of the stabilizer system of the invention in resisting a yellow discoloration from NO$_x$ gas is apparent from the data.

Having regard to the foregoing disclosure, the following is claimed as inventive and patentable embodiments thereof:

1. A stabilizer composition for organic polymeric materials comprising
   (a) a 2,2,6,6-tetramethyl-4-piperidyl ether alcohol or ether in an amount from about 90 to about 35 parts by weight and having the general formula:

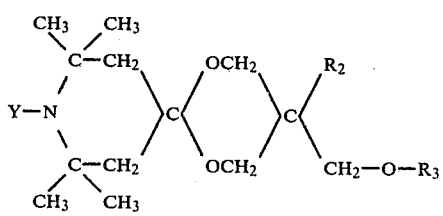

wherein
R₂ is lower alkyl or hydroxyalkyl having from one to six carbon atoms;
R₃ is a hydrogen atom, provided R₂ is hydroxyalkyl;

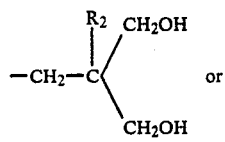
or

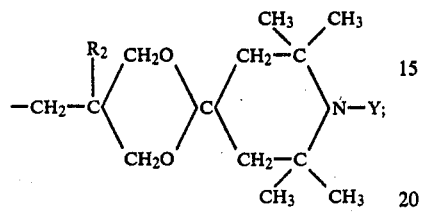

R₂ and R₃ may be taken together to form

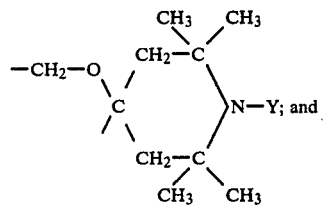

Y is selected from the group consisting of hydrogen and O;
(b) a phosphonic acid ester in an amount of from about 10 to about 35 parts by weight; and
(c) a phenolic antioxidant in an amount of from about 10 to about 35 parts by weight.

2. A stabilizer composition according to claim 1 in which R₂ is alkyl.

3. A stabilizer composition according to claim 1 in which R₂ is hydroxyalkyl.

4. A stabilizer composition according to claim 3 in which R₃ is hydrogen.

5. A stabilizer composition according to claim 1 in which R₂ and R₃ are taken together.

6. A stabilizer composition according to claim 1 in which Y is hydrogen.

7. A stabilizer composition according to claim 1 in which Y is O.

8. A stabilizer composition according to claim 1 in which the compound is

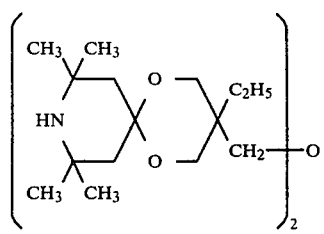

9. A stabilizer composition according to claim 1 in which the compound is

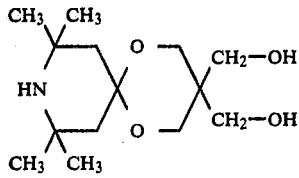

10. A stabilizer composition according to claim 1 in which the compound is

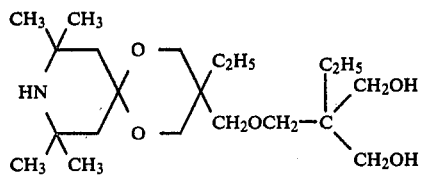

11. A stabilizer composition according to claim 1 in which the compound is

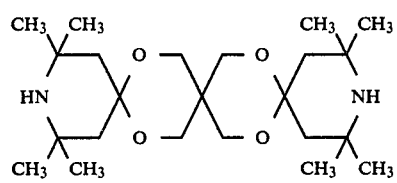

12. A stabilizer composition according to claim 1 in which the compound is

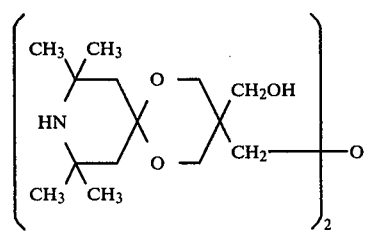

13. A stabilizer composition according to claim 1 in which the phosphonic acid ester has the formula:

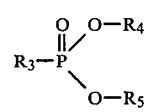

wherein
R₃, R₄ and R₅ are selected from the group consisting of alkyl and alkenyl having from about one or two to about thirty carbon atoms; cycloalkyl and cycloalkenyl having from three to about twelve carbon atoms; aryl, alkaryl and aralkyl having from six to about thirty carbon atoms, and alkoxyalkylene and alkoxypolyoxyalkylene in which the alkoxy and alkylene have from one or two to about thirty carbon atoms, and R₄ and R₅ taken together as an alkylene, cycloalkylene or arylene having from two to about thirty carbon atoms.

14. A stabilizer composition according to claim 13 in which the phenolic antioxidant has at least one phenolic hydroxyl group, at least one phenolic nucleus, and from about eight to about three hundred carbon atoms.

15. A stabilizer composition according to claim 14 in which the phenolic antioxidant is a monocyclic phenol having the structure:

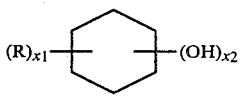

wherein

R is selected from the group consisting of hydrogen; halogen; and organic radicals containing from one to about thirty carbon atoms selected from the group consisting of alkyl, aryl, alkenyl, alkaryl, aralkyl, cycloalkenyl, cycloalkyl, alkoxy, and

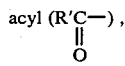

where R' is aryl, alkyl or cycloalkyl;

$x_1$ and $x_2$ are integers from one to four, and the sum of $x_1$ and $x_2$ does not exceed six.

16. A stabilizer composition according to claim 14 in which the phenolic antioxidant has the formula:

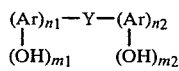

wherein

Y is a polyvalent linking group selected from the group consisting of oxygen; carbonyl; sulfur; sulfinyl; aromatic, aliphatic and cycloaliphatic hydrocarbon groups, and oxyhydrocarbon, thiohydrocarbon and heterocyclic groups having from one up to twenty carbon atoms;

Ar is a phenolic nucleus containing at least one free phenolic hydroxyl group up to a total of five;

$m_1$ and $m_2$ are numbers from one to five, and $n_1$ and $n_2$ are numbers from one to four.

17. A stabilizer composition according to claim 16 in which Ar is a benzene nucleus.

18. A polyvinyl chloride resin composition having improved resistance to deterioration when heated at 350° F., comprising a polyvinyl chloride resin formed at least in part of the recurring group

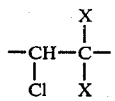

and having a chlorine content in excess of 40%, where X is either hydrogen or chlorine; and an amount to enhance the resistance to deterioration of the resin of a stabilizer composition in accordance with claim 1.

19. A polyvinyl chloride resin composition in accordance with claim 18, in which the polyvinyl chloride resin is polyvinyl chloride homopolymer.

20. A polyvinyl chloride resin composition in accordance with claim 18, in which the polyvinyl chloride resin is a copolymer of vinyl chloride and vinyl acetate.

21. An olefin polymer composition having improved resistance to deterioration comprising an olefin polymer selected from the group consisting of polymers of alpha-olefins having from two to six carbon atoms and polystyrene, and an amount to enhance the resistance of the polymer to deterioration of a stabilizer composition in accordance with claim 1.

22. An olefin polymer composition in accordance with claim 21, wherein the polyolefin is polypropylene.

23. An olefin polymer composition in accordance with claim 21, wherein the polyolefin is polyethylene.

24. An acrylonitrile-butadiene-styrene polymer having improved resistance to deterioration when heated at 300° F. comprising an acrylonitrile-butadiene-styrene polymer and an amount to enhance its resistance to deterioration of a stabilizer composition in accordance with claim 1.

25. A polyester resin composition having improved resistance to deterioration comprising a polyester resin and an amount to enhance the resistance of the polymer to deterioration of a stabilizer composition in accordance with claim 1.

26. A polyamide resin composition having improved resistance to deterioration comprising a polyamide resin and an amount to enhance the resistance of the polymer to deterioration of a stabilizer composition in accordance with claim 1.

27. An ethylene-vinyl acetate copolymer composition having improved resistance to deterioration comprising an ethylene-vinyl acetate copolymer and an amount to enhance the resistance of the polymer to deterioration of a stabilizer composition in accordance with claim 1.

* * * * *